(12) United States Patent
Miyazaki (10) Patent No.: US 8,503,019 B2
(45) Date of Patent: Aug. 6, 2013

(54) PRINT DOCUMENT CONVERSION APPARATUS AND COMPUTER READABLE MEDIUM

(75) Inventor: Koichi Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 406 days.

(21) Appl. No.: 13/023,752

(22) Filed: Feb. 9, 2011

(65) Prior Publication Data

US 2012/0013940 A1  Jan. 19, 2012

(30) Foreign Application Priority Data

Jul. 14, 2010  (JP) ................................. 2010-159616

(51) Int. Cl.
*G06F 3/12* (2006.01)
*G06K 15/00* (2006.01)

(52) U.S. Cl.
USPC .......................... 358/1.15; 358/1.13; 358/1.18

(58) Field of Classification Search
None
See application file for complete search history.

(56) References Cited

U.S. PATENT DOCUMENTS

| 5,333,246 A | 7/1994 | Nagasaka |
| 2003/0095282 A1 | 5/2003 | Suzuki et al. |
| 2009/0153892 A1 | 6/2009 | Torii |
| 2012/0013925 A1* | 1/2012 | Miyazaki ..................... 358/1.13 |
| 2012/0133984 A1* | 5/2012 | Hayakawa ................... 358/1.16 |

FOREIGN PATENT DOCUMENTS

| JP | A-2006-7496 | 1/2006 |
| JP | A-2009-269179 | 11/2009 |

OTHER PUBLICATIONS

Apr. 1, 2013 Office Action issued in U.S. Appl. No. 13/019,736.
Miyazaki; U.S. Appl. No. 13/019,736, filed Feb. 2, 2011.

* cited by examiner

*Primary Examiner* — Dov Popovici
(74) *Attorney, Agent, or Firm* — Oliff & Berridge, PLC (57) ABSTRACT

A print document conversion apparatus includes plural software-based conversion units and a controller. The plural software-based conversion units perform a software-based conversion process for converting print document data described in a page description language into page image data having a bitmap image format. Each of the software-based conversion units requests a hardware-based image processing apparatus to execute specific image processing in the software-based conversion process, and generates the page image data including a result of the specific image processing in response to the request. The controller activates an additional software-based conversion unit that performs the software-based conversion process when there is a possibility that a state where at least one of the software-based conversion units waits for the hardware-based image processing apparatus to complete the image processing occurs. The controller controls the number of additional software-based conversion units not to exceed a predetermined upper limit.

8 Claims, 7 Drawing Sheets

| RIP MODULE NUMBER | PAGE ALLOCATION STATUS | IMAGE PROCESSING APPARATUS USE STATUS |
|---|---|---|
| 1 | PAGE 1 | WAITING FOR PROCESS COMPLETION |
| 2 | PAGE 2 | UNUSED |
| 3 | NO PAGE | UNUSED |

PRINT DOCUMENT CONVERSION APPARATUS AND COMPUTER READABLE MEDIUM

CROSS-REFERENCE TO RELATED APPLICATIONS

This application is based on and claims priority under 35 USC 119 from Japanese Patent Application No. 2010-159616 filed Jul. 14, 2010.

BACKGROUND (i) Technical Field

The present invention relates to a print document conversion apparatus and a computer readable medium storing a program.

(ii) Related Art

Print data written in a page description language (PDL) such as PostScript (registered trademark) or Portable Data Format (PDF) (published as ISO 32000-1) is converted into a bitmap image (also referred to as a raster image) by a conversion module called a raster image processor (RIP), and is printed by a printer. The conversion module is responsible for language processing such as PDL interpretation, and is generally implemented by software.

However, some of the processes performed by a RIP, such as image processing on a bitmap image object (for example, color space conversion, rotation, and enlargement/reduction), may be executed at a higher speed by using a dedicated hardware-based image processing circuit than by performing software processing using a general-purpose computer. A system in which a software-based RIP module requests a hardware-based image processing circuit to perform image processing has been proposed.

Also, the recent growth of multi-core processors may make it possible to parallelize RIP software to run on multiple processor cores to increase the processing speed. In a configuration in which the number of hardware-based image processing apparatuses is smaller than the number of processor cores on which RIP software is parallelized to run, when a certain RIP software task among the RIP software tasks executed in parallel requests an image processing apparatus to perform image processing, the request may not necessarily be processed immediately if all the image processing apparatuses have already started processing other requests. While a RIP software task waits for processing performed by an image processing apparatus to be completed, the processor that executes the RIP software task is in a wait state without performing processing.

SUMMARY

According to an aspect of the invention, there is provided a print document conversion apparatus including plural software-based conversion units and a controller. The plural software-based conversion units perform a software-based conversion process for converting print document data described in a page description language into page image data having a bitmap image format. Each of the plural software-based conversion units requests a hardware-based image processing apparatus to execute specific image processing in the software-based conversion process, and generates the page image data including a result of the image processing executed by the hardware-based image processing apparatus in response to the request. The controller activates an additional software-based conversion unit that performs the software-based conversion process when there is a possibility that a state where at least one of the plural software-based conversion units waits for the hardware-based image processing apparatus to complete the image processing occurs. The controller controls the number of additional software-based conversion units not to exceed a predetermined upper limit.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described hereinafter with reference to the drawings. In figures, the same or similar components are assigned the same reference numerals.

First, an example of a system including a print data conversion apparatus according to an exemplary embodiment will be described with reference to FIG. 1. The system includes a print data conversion apparatus 100, a host computer 140, a print control apparatus 160, and a printer engine 170.

The print data conversion apparatus 100 is an apparatus configured to convert print document data written in PDL into print image data such as bitmap image data acceptable by the printer engine 170. The host computer 140 sends print document data to the print data conversion apparatus 100 via a network such as a local area network (LAN) 130, and instructs the print data conversion apparatus 100 to print the print document data.

The print data conversion apparatus 100 includes a controller 110. The controller 110 includes communication controllers 112 and 120 that are connected to each other so as to be communicable with each other via a local bus 122, a multi-CPU 114, a local memory 116, and a secondary storage device 118. The communication controller 112 is a device configured to perform data communication with the host computer 140 via the LAN 130. For example, the communication controller 112 receives a print instruction or print document data from the host computer 140, or exchanges print control information with the host computer 140. The multi-CPU 114 may be a processor package having multiple CPU cores. The local memory 116 is a main memory that is used as, for example, a work area by each CPU core of the multi-CPU 114, and may be, for example, a random access memory or the like. The secondary storage device 118 may be a non-volatile storage device having a relatively large capacity such as a hard disk device or an electrically erasable programmable read only memory (EEPROM), and stores a program executed by the multi-CPU 114, print document data received from the host computer 140, and the like. A control program describing the content of processes of various functional modules such as RIP modules 210 described below is stored in, for example, the secondary storage device 118, and is executed by the multi-CPU 114. A fraction of the control program may be executed in parallel by plural CPU cores of the multi-CPU 114. The multi-CPU 114 executes the control program to covert print document data into print image data of respective pages. The communication controller 120 is a device configured to perform data communication with the print control apparatus 160 via a network called an intra-system network 150. In the illustrated example, the print data conversion apparatus 100 and the print control apparatus 160 (and the printer engine 170) are interconnected via the intra-system network 150 to construct a single printing system. The print image data of respective pages generated by the processing of the multi-CPU 114 is transmitted to the print control apparatus 160 via the communication controller 120 and the intra-system network 150.

An image processing apparatus 125 is an apparatus including a hardware-based image processing circuit dedicated to image processing, such as a graphic accelerator. The hardware-based image processing circuit has a circuit configuration for executing at least one of various bitmap image processing operations such as color space conversion, enlargement/reduction of an image, rotation of an image, and halftone processing. The image processing apparatus 125 may be connected as, for example, an add-on board to a slot provided in, for example, the local bus 122 of the controller 110.

A RIP processing program (a RIP module 210 described below) executed by the multi-CPU 114 may be used to request the image processing apparatus 125 to perform image processing or the like and to create page image data upon receipt of the processing result. However, as described below, the RIP module 210 is also capable of executing the same image processing by itself using software.

The printer engine 170 is a hardware printing component that prints an image represented by print image data on paper using a coloring agent such as ink or toner. The print control apparatus 160 is an apparatus configured to control the printer engine 170, and includes a communication controller 162, a page controller 164, and an engine controller 166. The communication controller 162 communicates with the print data conversion apparatus 100 via the intra-system network 150 to receive print image data of respective pages or exchange various control information necessary for print control. The page controller 164 accumulates the received print image data of respective pages, and sends the print image data of respective pages to the engine controller 166 in accordance with the print order. The engine controller 166 supplies the received print image data of respective pages to the printer engine 170. The printer engine 170 prints the received print image data on paper.

Figure 1:
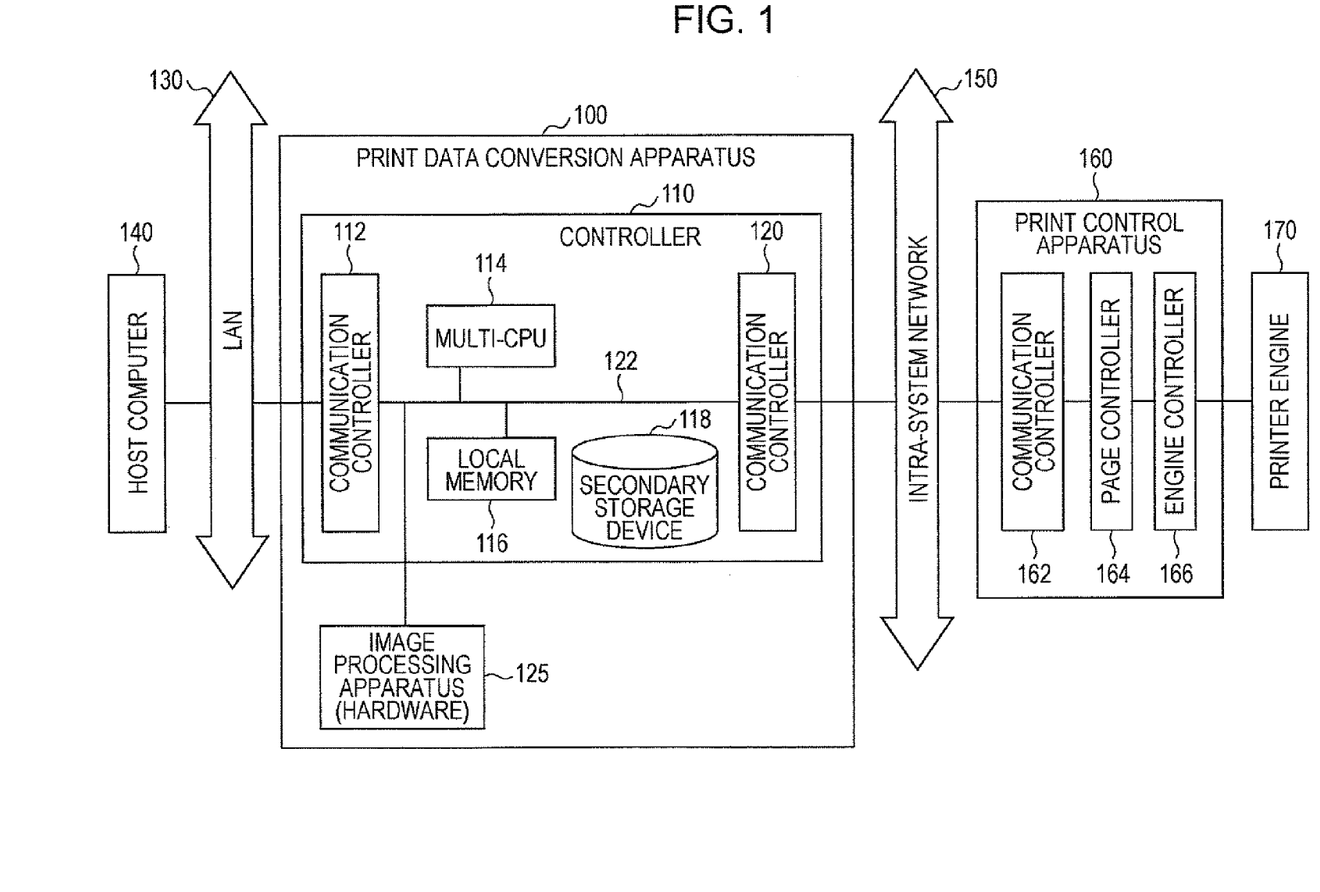
FIG. 1 illustrates an example hardware configuration of a printing system including an apparatus according to an exemplary embodiment.
Figure 2:
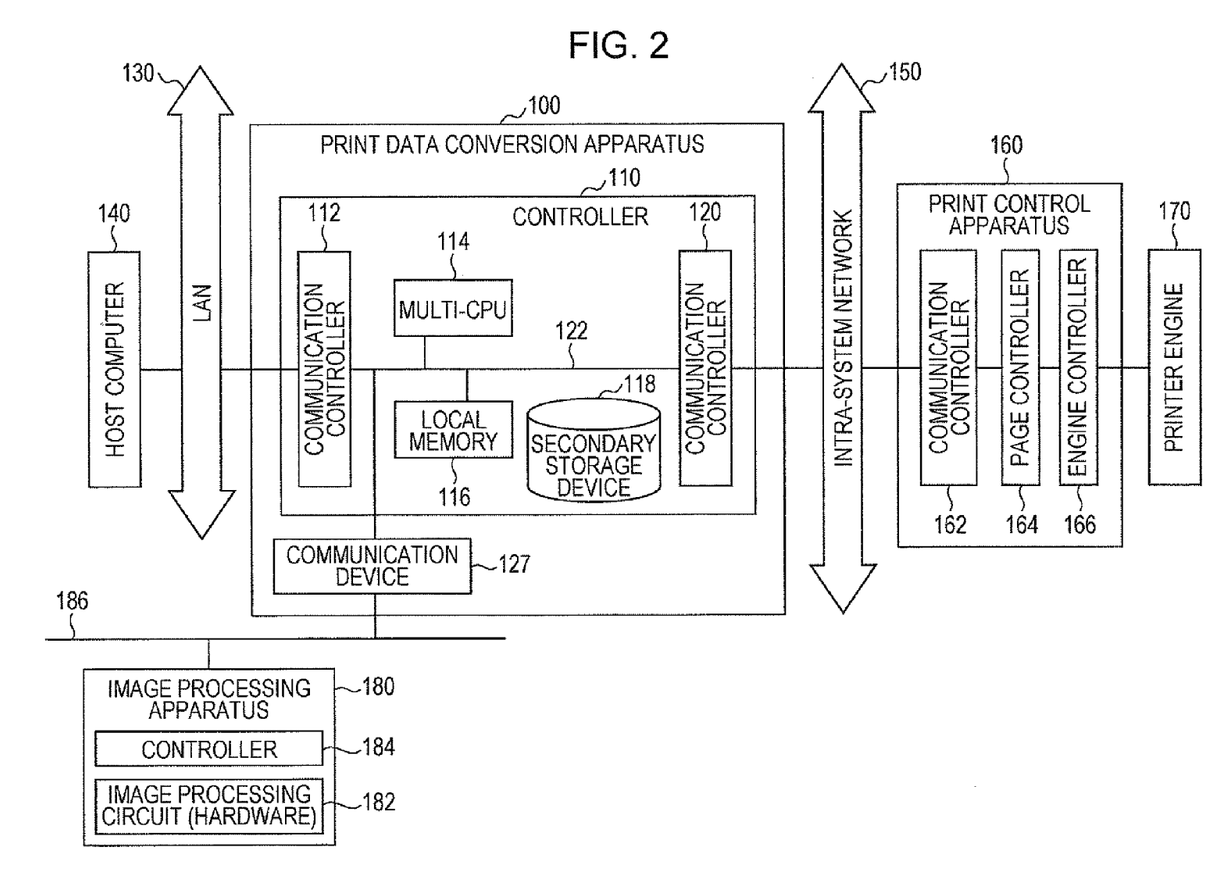
FIG. 2 illustrates another example hardware configuration of the printing system including the apparatus according to the exemplary embodiment.

FIG. 2 illustrates another example of the system including the apparatus according to the exemplary embodiment. In the example illustrated in FIG. 1, the image processing apparatus 125 is provided within the print data conversion apparatus 100. In the example illustrated in FIG. 2, in contrast, an image processing apparatus 180 including an image processing circuit 182 that is similar to the hardware-based image processing circuit included in the image processing apparatus 125 is provided outside the print data conversion apparatus 100. The image processing apparatus 180 is connected to a network 186 to which a communication device 127 included in the print data conversion apparatus 100 is connected, and receives an image processing request from the print data conversion apparatus 100 or returns an image processing result to the print data conversion apparatus 100 via the network 186. The network 186 may be the same network as the intra-system network 150 (or the LAN 130), and, in this case, the communication device 127 may be the same as the communication controller 120 (or 112). The image processing apparatus 180 further includes a controller 184 configured to perform operations such as communication via the network 186 and management of requests from the print data conversion apparatus 100.

Next, an example of the functional module configuration of the print data conversion apparatus 100 according to the exemplary embodiment will be described with reference to FIG. 3. The functional module configuration of the print data conversion apparatus 100 illustrated by way of example in FIG. 3, except for an image processing apparatus 220, is implemented by executing a control program using the multi-CPU 114 of the controller 110.

Figure 3:
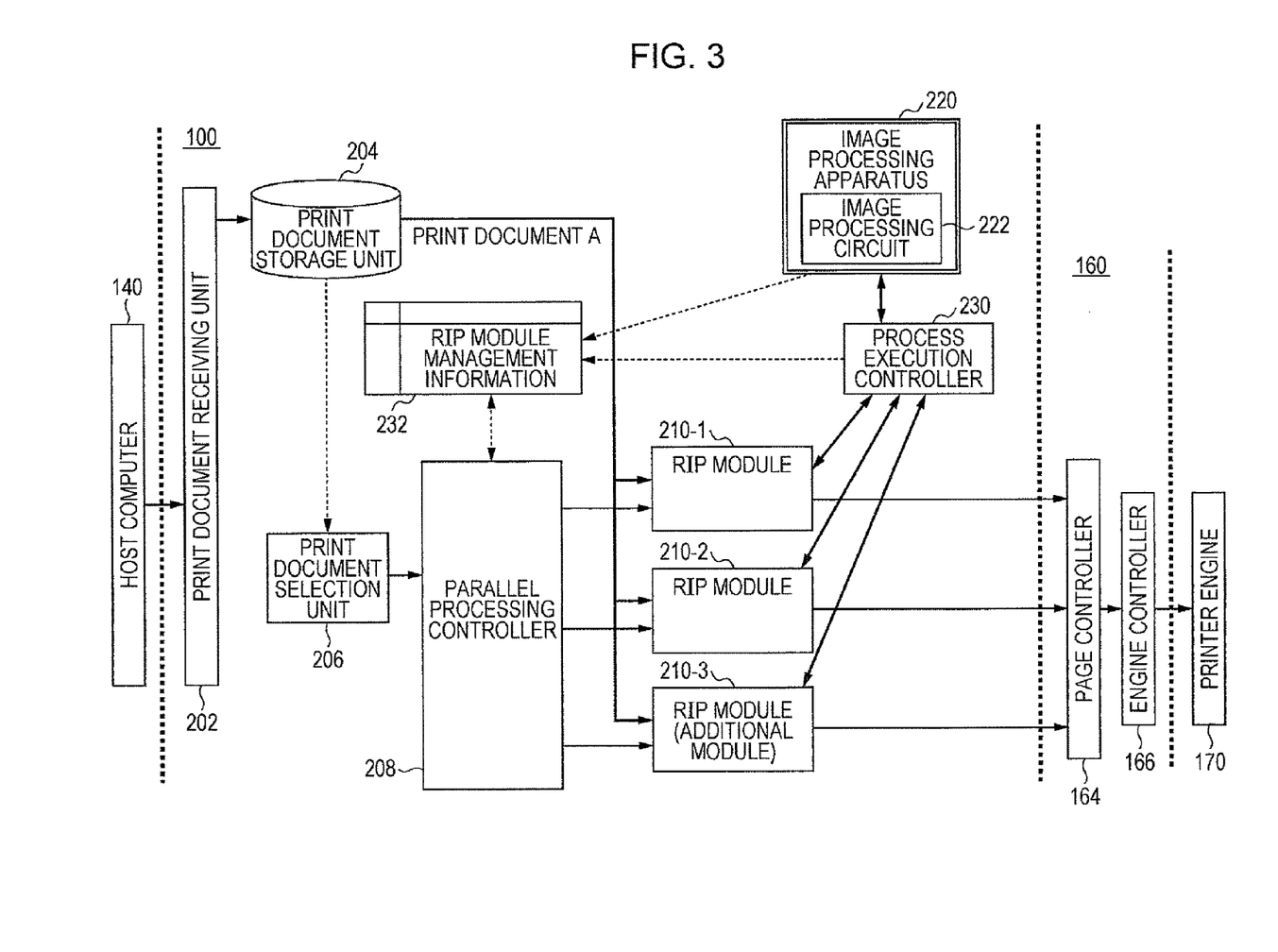
FIG. 3 is a functional block diagram illustrating an example of a print data conversion apparatus according to the exemplary embodiment.

In FIG. 3, a print document receiving unit 202 receives print document data from the host computer 140. A print document storage unit 204 stores PDL print document data received from the host computer 140. The print document data may be, for example but not limited to, data described in page independent PDL (for example, PDF). The term "page independent" means that information describing print image data of a page is represented only by PDL data regarding the page and is not dependent on PDL data regarding other pages. The print document storage unit 204 may store plural pieces of print document data together with information about, for example, the print order. A print document selection unit 206 selects an object to be printed from the print document data stored in the print document storage unit 204. For example, each time print processing that is currently being executed is completed, next print document data is selected as an object to be printed in accordance with print order information.

A parallel processing controller 208 performs control to cause the print document data selected by the print document selection unit 206 to be processed in parallel using the RIP modules 210. The parallel processing controller 208 determines the number of (in the example illustrated in FIG. 3, three) RIP modules 210 to be activated, and allocates different pages in the print document data to RIP modules 210-1 to 210-3 (hereinafter generally referred tows a "RIP module 210" or "RIP modules 210" unless otherwise specified individually). The page allocation may be performed by, for example, causing the parallel processing controller 208 to notify the RIP modules 210 of the page numbers to be allocated. Specific control operations performed by the parallel processing controller 208 will be described in detail below.

The RIP modules 210 may be software-based modules configured to interpret print document data described in PDL and to convert the print document data into a bitmap (or raster) image acceptable by the printer engine 170. For example, upon detection of a rendering command for rendering an image object such as a font, an image, or a form during the interpretation of PDL data of the allocated pages in order starting from the beginning, each of the RIP modules 210 executes the rendering command, and writes a pixel value in a storage area of an individual pixel, which is reserved on the local memory 116, in accordance with the command. Further, each of the RIP modules 210 has a function of executing image processing such as color space conversion, rotation, enlargement/reduction, and halftone processing on a bitmap image formed in the above manner in accordance with a command or setting in the PDL data.

The RIP modules 210-1 to 210-3 are implemented as devices configured to execute the processes described above by causing individual CPU cores of the multi-CPU 114 to execute a program group describing the processes described above. The RIP modules 210-1 to 210-3 are executed by the CPU cores as processes or threads. In a typical example, a single CPU core executes one RIP module 210. However, any other configuration may be used, and, for example, a single CPU core may execute multiple RIP modules 210. In FIG. 3, by way of example, three RIP modules 210 are executed. As described above, the number of RIP modules 210 executed in the print data conversion apparatus 100 is determined by the parallel processing controller 208.

As described above, each of the RIP modules 210 is capable of executing image processing by itself. However, the image processing apparatus 220 that is a hardware component dedicated to the image processing generally provides higher speed processing. Thus, in a basic operation, if RIP processing involves image processing to be performed, each of the RIP modules 210 requests the image processing apparatus 220 to perform image processing.

As described above, in this exemplary embodiment, plural RIP modules 210 perform RIP processing on plural pages in parallel. Upon completion of a process for converting PDL data of one page, each of the RIP modules 210 supplies print image data of the page, which is formed on a page image memory, to the printer engine 170 via the print control apparatus 160.

The image processing apparatus 220 is an apparatus in which a hardware-based image processing circuit executes the same image processing as the image processing based on software processing of the RIP modules 210, and may correspond to the image processing apparatus 125 illustrated in FIG. 1 or the image processing apparatus 180 illustrated in FIG. 2. In the example illustrated in FIG. 1, by way of example, the image processing apparatus 220 includes one hardware-based image processing circuit capable of executing processing similar to the image processing based on software processing of the RIP modules 210.

A process execution controller 230 receives a request for performing image processing which is issued from a RIP module 210 to the image processing apparatus 220, and causes the image processing apparatus 220 to execute the requested image processing. When the image processing performed by the image processing apparatus 220 is completed, the process execution controller 230 passes the image processing result to the requesting RIP module 210.

Since the image processing apparatus 220 performs hardware processing, the processing speed of the image processing apparatus 220 is higher than that obtained when each individual RIP module 210 performs the same processing using software processing. If the image processing apparatus 220 receives a request from a certain RIP module 210 to perform image processing while executing image processing requested by another RIP module 210, the image processing apparatus 220 starts the later requested image processing after the completion of the earlier requested image processing. Thus, if plural RIP modules 210 request the image processing apparatus 220 to perform image processing, all the RIP modules 210 may be in the state of waiting for the processing performed by the image processing apparatus 220 to be completed. In this case, the CPU cores of the multi-CPU 114 that execute the RIP modules 210 do not execute RIP processing until one of the RIP modules 210 resumes RIP processing upon receipt of an image processing result from the image processing apparatus 220.

In the example of this exemplary embodiment, the parallel processing controller 208 monitors the state of the process executed by an individual RIP module 210, and allocates pages to as many RIP modules 210 as possible within the upper limit determined from the processing capability of the multi-CPU 114 so as to execute RIP processing in parallel. The above control reduces the possibility of no RIP processing being executed by the CPU cores of the multi-CPU 114. The parallel processing controller 208 performs control by referring to RIP module management information 232.

The RIP module management information 232 is management information that the determination controlled by the parallel processing controller 208 is based on. The RIP module management information 232 may be stored in, for example, the local memory 116. The RIP module management information 232 includes information regarding the processing capability of the multi-CPU 114 that executes the RIP modules 210 and the image processing apparatus 220 that is requested by the RIP modules 210 to perform image processing. In the example of this exemplary embodiment, the information regarding the processing capability of the multi-CPU 114 includes the number of CPU cores included in the multi-CPU 114. In the illustrated example, the information regarding the processing capability of the image processing apparatus 220 includes the total number of image processing circuits 222 included in an image processing apparatus 220 available in the print data conversion apparatus 100. The term "available image processing apparatus 220", as used herein, means an image processing apparatus that is available to execute image processing in response to a request from the RIP modules 210, and may be provided within (the image processing apparatus 125 illustrated in FIG. 1) or outside (the image processing apparatus 180 illustrated in FIG. 2) the print data conversion apparatus 100. In the example illustrated in FIGS. 1 to 3, since one image processing circuit 222 in one image processing apparatus 220 is available in the print data conversion apparatus 100, the RIP module management information 232 includes value "1" indicating the total number of available image processing circuits 222. The total number of available image processing circuits may be obtained by, for example, acquiring the number of image processing circuits 222 in an available image processing apparatus 220 from the image processing apparatus 220 when the print data conversion apparatus 100 is initialized.

Figure 4:
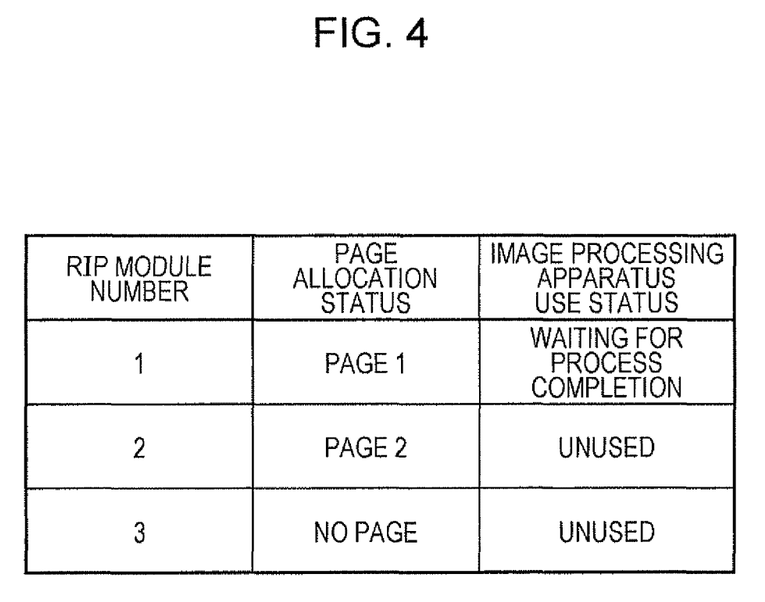
FIG. 4 illustrates an example of information included in RIP module management information.

The RIP module management information 232 further includes information indicating the state of the process executed by each RIP module 210. FIG. 4 illustrates an example of the information indicating the state of the execution of the processes. A table in the example illustrated in FIG. 4 represents, in association with "RIP module number" indicating the number of each of the RIP modules 210-1, 210-2, and 210-3, the "page allocation status" and "image processing apparatus use status" of the RIP module 210 corresponding to the number. In the example illustrated in FIG. 4, the "page allocation status" has a value representing the number of a page allocated to the corresponding RIP module 210 (such as "page 1" or "page 2") or information (such as "No page") indicating that no page is allocated to the corresponding RIP module 210. The table in the example illustrated in FIG. 4 indicates that "page 1" and "page 2" have been allocated to the RIP module 210-1 and the RIP module 210-2, respectively, and that no page is allocated to the RIP module 210-3. The "image processing apparatus use status" indicates whether or not the corresponding RIP module 210 is in the state of waiting for the image processing apparatus 220 to complete the image processing requested by the RIP module 210. In the example illustrated in FIG. 4, the "waiting for process completion" value in the "image processing apparatus use status" with respect to the RIP module number "1" indicates that the RIP module 210-1 has requested the image processing apparatus 220 to perform image processing and is currently waiting for the process result. Further, the "unused" value of the "image processing apparatus use status" with respect to the RIP module numbers "2" and "3" indicates that the RIP modules 210-2 and 210-3 have not yet requested the image processing apparatus 220 to perform image processing at the present time.

In the example of this exemplary embodiment, the value of each individual items in the table illustrated by way of example in FIG. 4 is registered and updated by the parallel processing controller 208 and the process execution controller 230. For example, when the RIP modules 210 are activated, the parallel processing controller 208 registers the number of each of the activated RIP modules 210 as a RIP module number in the RIP module management information 232. At this time, the initial values of the "page allocation status" and the "image processing apparatus use status" with respect to each RIP module number are set to "No page" and "unused", respectively. Further, the "page allocation status" with respect to each RIP module number is set to the page number of a page by the parallel processing controller 208 when the parallel processing controller 208 allocates the page to the corresponding RIP module 210. When the RIP processing on the page is completed, the parallel processing controller 208 returns the "page allocation status" with respect to the corresponding RIP module number to "No page". Further, when the process execution controller 230 receives an image processing request from the RIP modules 210, the process execution controller 230 sets the "image processing apparatus use status" with respect to each individual RIP module number to "waiting for process completion". After that, when the image processing apparatus 220 completes the image processing and returns the result to the requesting RIP module 210, the process execution controller 230 returns the "image processing apparatus use status" with respect to the corresponding RIP module number to "unused".

By referring to the RIP module management information 232 as described above, the parallel processing controller 208 determines the number of RIP modules 210 to be activated and controls the allocation of a page to each individual RIP module 210. For example, the parallel processing controller 208 determines the number of RIP modules 210 to be activated on the basis of the processing capability of the multi-CPU 114 that executes the RIP modules 210 and the image processing apparatus 220 that executes image processing in response to a request from the RIP modules 210. In the example of this exemplary embodiment, the parallel processing controller 208 acquires the sum of the number of CPU cores of the multi-CPU 114 and the number of image processing circuits 222 included in an available image processing apparatus 220 from the RIP module management information 232, and sets the sum as the number of RIP modules 210 to be activated. In FIG. 3, an example where the number of CPU cores is "2" and the total number of image processing circuits 222 is "1" is illustrated, and three RIP modules 210-1, 210-2, and 210-3 are activated. As described above, in the print data conversion apparatus 100 in a typical example, one CPU core executes one RIP module 210. Therefore, if the number of RIP modules 210 is determined in the manner as in the example of this exemplary embodiment, a number of additional RIP modules 210 corresponding to the total number of image processing circuits 222 are activated in addition to the case in the typical example. The RIP module 210-3 illustrated in FIG. 3 is an example of an additional RIP module 210. In the example of this exemplary embodiment, the functions of the additional RIP module 210-3 are similar to those of the other RIP modules 210-1 and 210-2.

Furthermore, the parallel processing controller 208 allocates a page in print document data to each individual RIP module 210 by referring to the information (FIG. 4) indicating the state of the execution of the process of the RIP module 210 which is included in the RIP module management information 232. The parallel processing controller 208 in the example of this exemplary embodiment performs page allocation so that the number Srun of RIP modules 210 that are currently executing RIP processing (software processing) does not exceed a maximum value Smax determined from the processing capability of the multi-CPU 114. The value Srun is determined by counting the number of RIP modules 210 that have already been allocated pages and that are not waiting for image processing to be completed. In a case where the information in the example illustrated in FIG. 4 is referred to, the value Srun may be determined by subtracting the number W of RIP modules 210 that are in the state of waiting for image processing to be completed (W=1) from the number A of RIP modules 210 that have been allocated pages (A=2), that is, Srun=1 (=A−W). The value Smax is the upper limit number of RIP modules 210 that are allowed to execute RIP processing simultaneously. In the example of this exemplary embodiment, the value Smax may be set to the number of CPU cores included in the multi-CPU 114. Thus, in the example of this exemplary embodiment, the value Smax is smaller than the number of RIP modules 210 to be activated (the sum of the number of CPU cores and the number of image processing circuits). In the example illustrated in FIG. 3 described above in which the number of CPU cores is two, Smax=2 is obtained. In this example, if Srun=1 is determined by referring to the information illustrated in FIG. 4, the number of RIP modules 210 that are currently executing RIP processing is smaller than the value Smax (Smax=2) by 1. In this state, if the allocation of a new page is needed, since Srun<Smax, the parallel processing controller 208 allocates the new page to one RIP module 210-3 that has not been allocated a page. In another specific example, if the RIP modules 210-1 and 210-2 illustrated in FIG. 3 are currently executing RIP processing and the RIP module 210-3 has not been allocated a page, Srun=Smax=2 is obtained. In this state, even if the allocation of a new page is needed, the parallel processing controller 208 does not allocate the new page to the RIP module 210-3. After that, when at least one of the RIP modules 210-1 and 210-2 is in the state of waiting for image processing to be completed due to the lapse of time or if Srun<Smax=2 is obtained because of the completion of RIP processing, the parallel processing controller 208 allocates the new page to the RIP module 210-3.

An example configuration of a system including a print data conversion apparatus according to an exemplary embodiment and the control performed by a parallel processing controller have been described with reference to FIGS. 1 to 4. The print document selection unit 206, the parallel processing controller 208, and the process execution controller 230 described above may be executed by any of the CPU cores in the multi-CPU 114.

Figure 5:
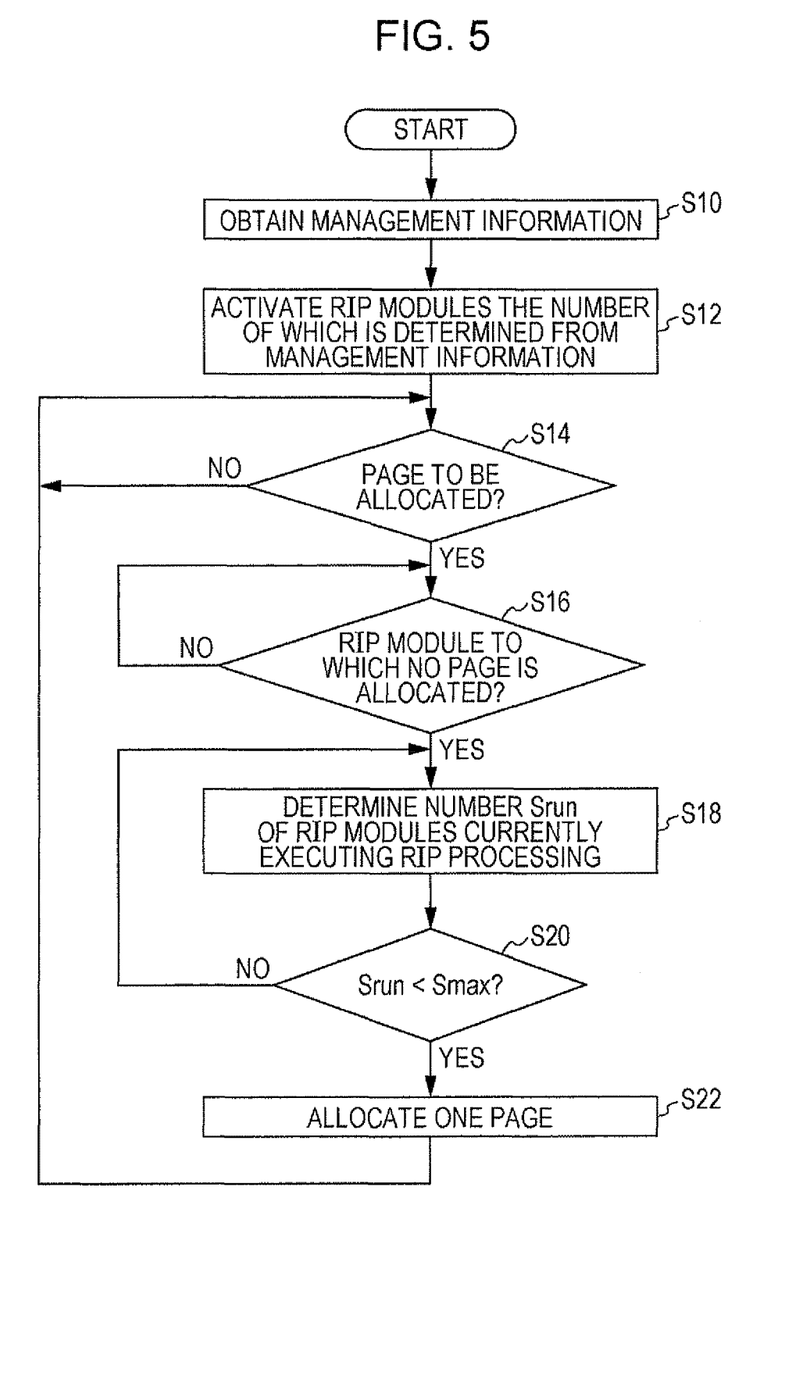
FIG. 5 is a flowchart illustrating an example of a processing procedure of a parallel processing controller.

A description will now be given of an example of the operation of the print data conversion apparatus 100. FIG. 5 is a flowchart illustrating an example of a processing procedure performed by the parallel processing controller 208. When the power supply (not illustrated) of the print data conversion apparatus 100 is turned on and the print data conversion apparatus 100 is activated, the parallel processing controller 208 starts the process of the procedure in the example illustrated in FIG. 5.

First, the parallel processing controller 208 obtains RIP module management information 232 (step S10), and activates RIP modules 210, the number of which is determined from the obtained RIP module management information 232 (step S12). In the example described above with reference to FIG. 3, the parallel processing controller 208 determines the sum of the number ("2") of CPU cores and the number ("1") of image processing circuits 222 included in the RIP module management information 232, that is, "3", and activates the three RIP modules 210-1, 210-2, and 210-3.

Then, the parallel processing controller 208 waits until the print document selection unit 206 notifies the parallel processing controller 208 of the selection of print document data including a page to be allocated (in process loop if NO is determined in step S14).

Upon receipt of a notification of the selection of Print document data (that is, if a page to be allocated exists) (YES in step S14), the parallel processing controller 208 refers to the RIP module management information 232, and checks whether or not a RIP module 210 to which no page is allocated exists (step S16).

If all the activated RIP modules 210 have been allocated pages and a RIP module 210 to which no page is allocated does not exist (NO in step S16), the parallel processing controller 208 repeats the determination of step S16 until the RIP processing of any of the RIP modules 210 has been completed and a RIP module 210 to which no page is allocated is found (until YES is determined in step S16). The determination of step S16 may be performed by checking the RIP module management information 232 about the value of the "page allocation status" with respect to each RIP module number in the table in the example of FIG. 4.

If a RIP module 210 to which no page is allocated is found (YES in step S16), the parallel processing controller 208 determines the number Srun of RIP modules 210 that are currently executing RIP processing (step S18). In step S18, for example, as described above with reference to FIG. 4, the parallel processing controller 208 refers to the RIP module management information 232, and determines the value Srun by subtracting the number W of RIP modules 210 that are waiting for image processing to be completed from the number A of RIP modules 210 to which pages have been allocated. If the processing of step S18 is performed first on certain print document data, the number A of RIP modules to which pages have been allocated and the number W of RIP modules 210 that are in the state of waiting for image processing to be completed are "0", and Srun=0 is obtained.

If the value Srun determined in step S18 is greater than or equal to the maximum value Smax of RIP modules 210 that are allowed to execute RIP processing simultaneously (NO in step S20), the process returns to step S18, and the number Srun of RIP modules 210 that are currently executing software processing is determined again. Then, the determination of step S20 is performed. If, due to the lapse of time, the processing is completed in a RIP module 210 that is currently executing RIP processing and the value Srun decreases and becomes smaller than the value Smax, YES is determined in step S20.

If the value Srun determined in step S18 is smaller than the value Smax (YES in step S20), one page is allocated to one of RIP modules 210 to which no pages are allocated (step S22). For example, the parallel processing controller 208 notifies the RIP module 210 of the page number of the allocated page.

After step S22, the process returns to the determination of whether or not a page to be allocated exists (step S14).

An example of a procedure of page allocation control performed by the parallel processing controller 208 has been described with reference to FIG. 5. The basic method of page allocation is not particularly limited. For example, pages may be allocated to the RIP modules 210 in a fixed manner in order, starting from the top page, in accordance with the numbers of the RIP modules 210, or may be allocated dynamically in order, starting from the RIP module 210 that has completed its page conversion processing. In either method of allocation, the parallel processing controller 208 executes the processing of steps S18 and S20 in FIG. 5 when allocating an individual page, checks that Srun<Smax holds, and then notifies the RIP modules 210 of the page numbers to be allocated.

Here, specific examples of page allocation to the RIP modules 210-1, 210-2, and 210-3 illustrated by way of example in FIG. 3 using the procedure in the example illustrated in FIG. 5 will be described in the context of case (1) where a wait for image processing to be completed occurs and case (2) where a wait for image processing to be completed does not occur. In either case (1) or (2), the RIP modules 210-1, 210-2, and 210-3 are activated through the processing up to step S12 in FIG. 5. Further, it is assumed that Smax=2.

(1) Case Where a Wait for Image Processing to be Completed Occurs

First, when the first page among pages to be allocated is allocated, all the RIP modules 210-1, 210-2, and 210-3 have not been allocated pages (YES in step S16), and the number of RIP modules 210 that are currently executing RIP processing is 0 (Srun=0) and satisfies Srun<Smax (YES in step S20). Thus, in step S22, the parallel processing controller 208 allocates the first page to the RIP module 210-1. At this time, the number A of RIP modules 210 to which a page has been allocated is 1 (A=1). Further, in this example, by way of example, RIP processing for the first page involves image processing. Therefore, the RIP module 210-1 requests the image processing apparatus 220 to perform image processing, and is in the state of waiting for image processing to be completed. Thus, the number W of RIP modules 210 that are in the state of waiting for image processing to be completed is 1 (W=1).

Then, in the allocation of the second page, no page has been allocated to the RIP module 210-2 or 210-3 (YES in step S16). Then, in step S18, the value Srun is determined. Here, as described above, since A=1 and W=1 are obtained, Srun=A−W=0 is determined. Therefore, Srun<Smax holds (YES in step S20). Then, in step S22, the parallel processing controller 208 may allocate the second page to the RIP module 210-2. At this time, the number A of RIP modules 210 to which pages have been allocated is 2 (A=2). In this example, furthermore, by way of example, RIP processing for the second page also involves image processing, and the RIP module 210-2 requests the image processing apparatus 220 to perform image processing and enters the state of waiting for image processing to be completed. In this case, if the image processing apparatus 220 has not completed the image processing performed in accordance with the request from the RIP module 210-1, both the RIP modules 210-1 and 210-2 are in the state of waiting for image processing to be completed, and W=2 is determined.

Further, in the allocation of the third page, no page has been allocated to the RIP module 210-3 (YES in step S16). Then, in step S18, the value Srun is determined. At this time, since A =2 and W=2 are obtained, Srun=A−W=0 is obtained. Therefore, Srun<Smax holds (YES in step S20). Then, in step S22, the parallel processing controller 208 allocates the third page to the RIP module 210-3. At this time, the number A of RIP module 210 to which pages have been allocated is 3 (A=3). If RIP processing for the third page does not involve image processing, the RIP module 210-3 executes RIP processing for the third page. In this case, the RIP modules 210-1 and 210-2 are in the state of waiting for image processing to be completed, and the RIP module 210-3 utilizes a CPU core of the multi-CPU 114 for the RIP processing if none of the CPU cores of the multi-CPU 114 is used. During the period for which the RIP module 210-3 utilizes a CPU core, Srun=A−W=3−2=1 is obtained, and Srun<Smax=2 holds.

(2) Case Where a Wait for Image Processing to be Completed Does Not Occur

The allocation of the first page is performed in a manner similar to that in the example in the case (1) described above, and it is assumed that the first page has been allocated to the RIP module 210-1. In this example, however, RIP processing for the first page does not involve image processing, and the RIP module 210-1 does not enter the state of waiting for image processing to be completed. At this time, the number A of RIP modules 210 to which pages have been allocated is 1 (A=1), and the number W of RIP modules 210 in the state of waiting for image processing to be completed is 0 (W=0).

In the allocation of the second page, no page has been allocated to the RIP module 210-2 or 210-3 (YES in step S16). Then, in step S18, the value Srun is determined. Here, since A=1 and W=0 are obtained, Srun=1 is determined. Further, since Srun<Smax=2 holds (YES in step S20), then, in step S22, the parallel processing controller 208 may allocate the second page to the RIP module 210-2. In this example, RIP processing for the second page does not involve image processing, and the RIP module 210-2 executes RIP processing for the second page by itself. At this time, A=2 and W=0 are determined.

Next, in the allocation of the third page, no page has been allocated to the RIP module 210-3 (YES in step S16). Then, in step S18, the value Srun is determined. Here, since A=2 and W=0 are obtained, Srun=2 is determined, which is equal to the value Smax (Smax=2). Therefore, NO is determined in step S20, and loop processing including steps S18 and S20 is repeated. When the RIP processing of at least one of the RIP modules 210-1 and 210-2 is completed due to the lapse of time, the number A of RIP modules 210 to which pages have been allocated decreases from "2" to "1" or "0", and the value Srun also becomes "1" or "0" (W=0 remains). Then, the condition that YES is determined in step S20, i.e., "Srun<Smax", is satisfied. Now, the parallel processing controller 208 allocates the third page to the RIP module 210-3 (step S22). In this example, no page is allocated to the RIP module 210-3 during the period for which the two RIP modules 210-1 and 210-2 utilize the multi-CPU 114.

As may be seen from the specific examples (1) and (2) described above, according to the loop processing including steps S18 and S20 in the example illustrated in FIG. 5, no new page is allocated to the RIP module 210 during a period for which a number of RIP modules 210 equal to or greater than the value Smax are executing RIP processing.

In the example of this exemplary embodiment, a number of RIP modules 210 greater than the value Smax may execute RIP processing simultaneously depending on the timing at which a RIP module 210 in the state of waiting for image processing to be completed receives an image processing result from the image processing apparatus 220 and resumes RIP processing. For example, in the specific example (1) described above, if RIP processing On the RIP module 210-2 for the second page does not involve image processing, A=2 and W=1 (in which case the RIP module 210-1 is in the state of waiting for image processing to be completed) are determined at the time when the allocation of the second page is completed. In this case, since Srun=2−1=1<Smax=2 is obtained, the third page is allocated to the RIP module 210-3, and A=3 and W=1 are determined. Here, Srun=3−1=2=Smax is obtained. If the image processing that the RIP module 210-1 has requested the image processing apparatus 220 to perform is completed and the RIP processing of the RIP module 210-1 is resumed before the completion of the RIP processing in the RIP modules 210-2 and 210-3, the three RIP modules 210-1, 210-2, and 210-3 are currently executing RIP processing (Srun=3>Smax). However, the RIP module 210-1 that has resumed RIP processing from the state of waiting for image processing to be completed has already completed the highest load (most time-consuming) image processing within RIP processing for allocated pages, and therefore the RIP processing may be considered to be completed within a relatively short period of time. In addition, no new page is allocated until Srun<Smax=2 is obtained. Therefore, a period of time during which Srun>Smax holds during a period from start to completion of the overall RIP processing of the print document data is shorter than that obtained when, for example, the processing of steps S18 and S20 is omitted in the procedure in the example illustrated in FIG. 5.

An exemplary embodiment of the present invention has been described with reference to FIGS. 1 to 5 in the context in which one image processing apparatus 220 is available and the image processing apparatus 220 includes one image processing circuit, by way of example. It is to be understood that the number of image processing apparatuses 220 and the number of image processing circuits included in each image processing apparatus 220 are not limited to those in the example described above.

Figure 6:
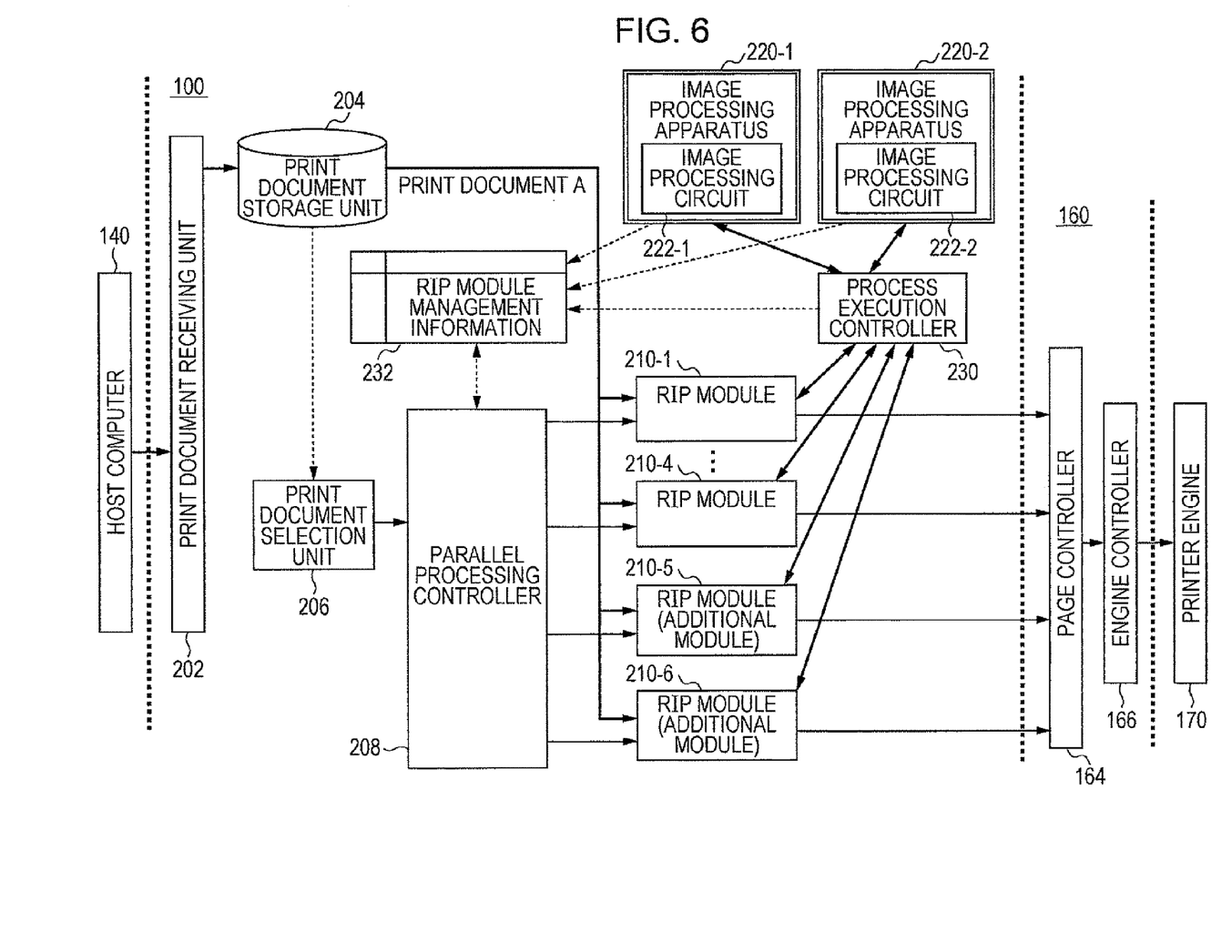
FIG. 6 is a functional block diagram illustrating another example of the print data conversion apparatus according to the exemplary embodiment.

For example, as illustrated in FIG. 6, plural image processing apparatuses 220 may be available in the print data conversion apparatus 100. FIG. 6 illustrates an example in which two image processing apparatuses 220-1 and 220-2 each including one image processing circuit 222 (i.e., image processing circuits 222-1 and 222-2) are available in the print data conversion apparatus 100. Similarly to the examples described with reference to FIGS. 1 to 3, the image processing apparatuses 220-1 and 220-2 illustrated in FIG. 6 may be provided within or outside the print data conversion apparatus 100. In the example illustrated in FIG. 6, furthermore, by way of example, the number of CPU cores of the multi-CPU 114 is "4". In the example illustrated in FIG. 6, the parallel processing controller 208 activates four RIP modules 210-1 to 210-4 (RIP modules 210-2 and 210-3 are not illustrated in FIG. 6) corresponding to the number of CPU cores, and two RIP modules 210-5 and 210-6 corresponding to the total number "2" of image processing circuits 222.

Figure 7:
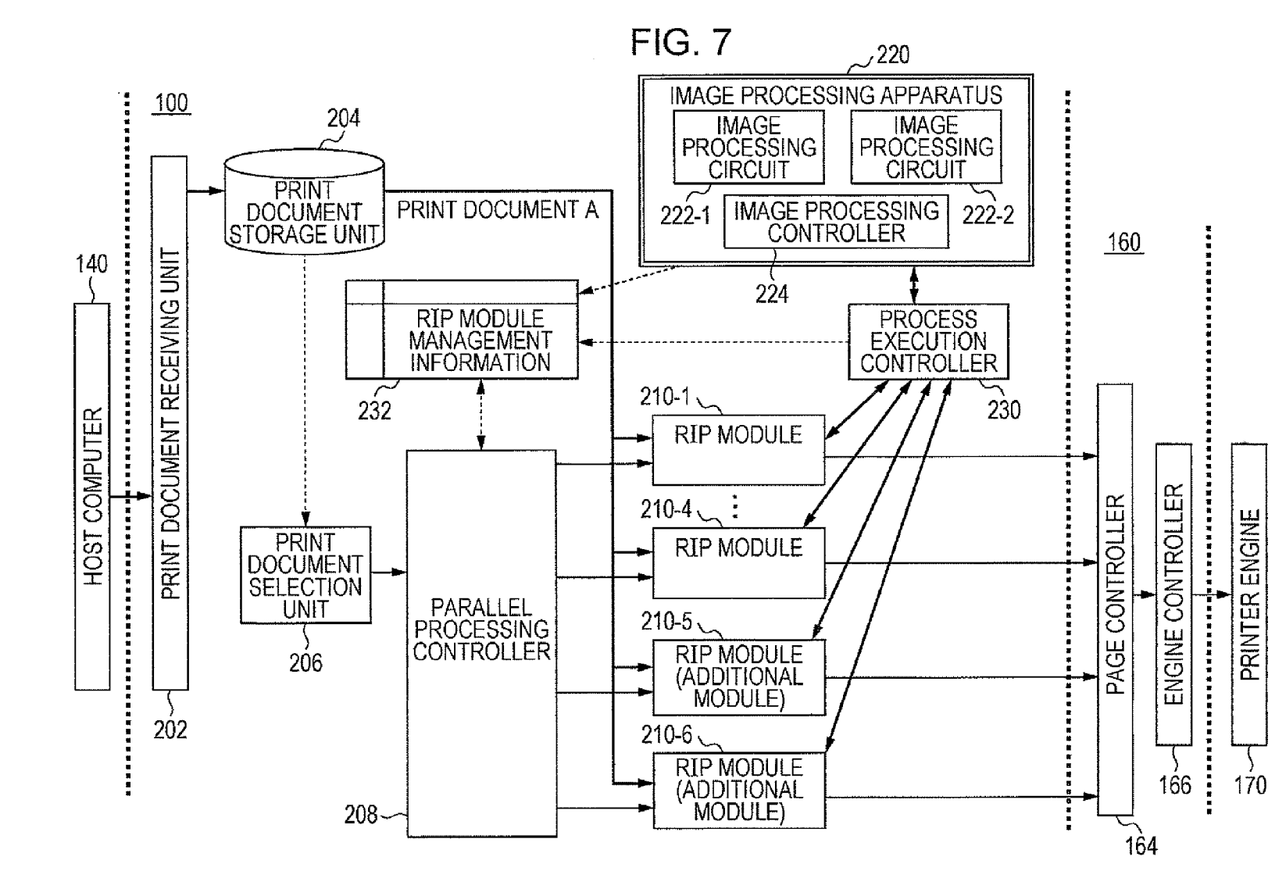
FIG. 7 is a functional block diagram illustrating still another example of the print data conversion apparatus according to the exemplary embodiment.

Further, in another example, as illustrated in FIG. 7, an image processing apparatus 220 including plural image processing circuits may be available. In FIG. 7, by way of example, one image processing apparatus 220 including two image processing circuits 222-1 and 222-2 is available. The image processing apparatus 220 also includes an image processing controller 224 that controls operations such as allocating processes to the two image processing circuits 222-1 and 222-2. The image processing controller 224 receives an image processing request from a RIP module 210 via the process execution controller 230, causes one of the image processing circuits 222-1 and 222-2 to execute the requested image processing, and returns a processing result to the process execution controller 230. The image processing apparatus 220 illustrated in FIG. 7 may also be provided within or outside the print data conversion apparatus 100. In the example illustrated in FIG. 7, furthermore, by way of example, the number of CPU cores of the multi-CPU 114 is "4". Also in the example illustrated in FIG. 7, the parallel processing controller 208 activates four RIP modules 210-1 to 210-4 (RIP modules 210-2 and 210-3 are not illustrated in FIG. 7) corresponding to the number of CPU cores, and two RIP modules 210-5 and 210-6 corresponding to the total number "2" of image processing circuits 222.

In either example illustrated in FIG. 6 or 7, the parallel processing controller 208 and each of the RIP modules 210 may perform processes similar to those described above with reference to FIGS. 3 to 5.

In the example of the exemplary embodiment described with reference to FIGS. 1 to 7, a number of RIP modules 210 corresponding to the sum of the number of core CPUs of the multi-CPU 114 and the number of available image processing circuits 222 of an image processing apparatus 220 are activated, and parallel RIP processing of individual pages of print document data is performed. In this case, pages are allocated to the RIP modules 210 so that the number of RIP modules 210 that executes RIP processing simultaneously using the multi-CPU 114 is limited to be less than or equal to the number of core CPUs.

In the example of the foregoing exemplary embodiment, the parallel processing controller 208 and the process execution controller 230 perform the registration and update of the RIP module management information 232. In a modification, a portion of the registration and update of the RIP module management information 232 may be performed by each RIP module 210. For example, information indicating the state of the execution of the processes of each RIP module 210 may be registered and updated by the RIP module 210 itself. Furthermore, the number of image processing circuits 222 included in each image processing apparatus 220 may be registered in the RIP module management information 232 by the image processing apparatus 220 itself, or may be specified by the process execution controller 230 and registered in the RIP module management information 232.

Furthermore, specific items of information indicating the state of the execution of the processes of the RIP modules 210 in the RIP module management information 232 are not limited to those illustrated by way of example in FIG. 4. For example, in FIG. 4, the "image processing apparatus use status" contains two types of values, that is, "waiting for process completion" and "unused". In a modification, the RIP module management information 232 may contain, as process states of each RIP module 210, values indicating three types of states, that is, "waiting for the completion of image processing", "RIP processing in progress", and "waiting for page allocation (that is, no page allocated)". In this example, the "page allocation status" item in the table in the example illustrated in FIG. 4 may be omitted. The number of RIP modules 210 in the state of "waiting for the completion of image processing" or "RIP processing in progress" in the process state may be used as the number A of RIP modules 210 to which pages have been allocated, and the process of the procedure in the example illustrated in FIG. 5 may be executed.

In the foregoing exemplary embodiment and modifications, all the plural RIP modules 210 that have been activated request the image processing apparatus 220 to perform image processing. In a modification, the parallel processing controller 208 may control some of the RIP modules 210 to execute image processing by themselves without requesting the image processing apparatus 220 to perform image processing. For example, a number of additional RIP modules 210 (for example, the RIP module 210-3 illustrated in FIG. 3, or the RIP modules 210-5 and 210-6 illustrated in FIGS. 6 and 7) corresponding to the number of CPU cores of the multi-CPU 114 among the plural RIP modules 210 may be controlled to execute image processing by themselves. Also in this modification, the procedure of page allocation control performed by the parallel processing controller 208 may be similar to that in the example illustrated in FIG. 5.

In the foregoing exemplary embodiment and modifications, furthermore, a number of RIP modules 210 corresponding to the sum of the number of core CPUs and the number of image processing circuits 222 are activated when the print data conversion apparatus 100 is activated. In a modification, first, the parallel processing controller 208 activates a number of RIP modules 210 corresponding to the number of core CPUs to execute RIP processing of respective pages of print document data. Then, a number of RIP modules 210 corresponding to the total number of image processing circuits 222 may be activated at the time when the RIP modules 210 enters the state of waiting for image processing to be completed. In this modification, the number of RIP modules 210 to be activated is limited to be equal to the sum of the number of core CPUs and the number of image processing circuits. In this modification, furthermore, the parallel processing controller 208 may perform page allocation control on the RIP module or modules 210 that have been activated at this time using the procedure in the example illustrated in FIG. 5.

In another modification, the number of RIP modules 210 to be activated may be determined on the basis of only information regarding the processing capability of an available image processing apparatus 220 regardless of the number of core CPUs of the multi-CPU 114. For example, for each of image processing circuits 222 included in an available image processing apparatus 220, an image processing capability index indicating the ratio of the processing capability of the image processing circuit to the processing capability of one RIP module 210 may be registered in the RIP module management information 232, and the number of RIP modules 210 to be activated may be determined on the basis of the image processing capability index. The term "processing capability", as used herein, means the time required to process a certain unit amount of image data (that is, the processing speed). The image processing capability index may also be a value indicating how many times the processing capability of an image processing circuit is greater than that of a RIP module 210. For example, if an image processing circuit is capable of executing certain image processing within one half the period of time required for a RIP module 210 to perform the same image processing, the image processing circuit has an image processing capability index of "2". Image processing capability indices may be determined using, for example, an experiment or the like for causing the image processing apparatus 220 and the RIP modules 210 to process a test image and measuring the processing time, and may be registered in the print data conversion apparatus 100. The parallel processing controller 208 sets the number of RIP modules 210 to be activated to, for example, the total image processing capability index of individual image processing circuits 222 of an available image processing apparatus 220. Alternatively, a number of RIP modules 210 greater than the total image processing capability index may be activated. Also in a modification in which the number of RIP modules 210 is determined using a total image processing capability index, page allocation control may be performed using the process of the procedure in the example illustrated in FIG. 5 so that the number of RIP modules 210 that execute RIP processing simultaneously is limited to the value Smax that is set on the basis of the processing capability of the multi-CPU 114.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print document conversion apparatus comprising:
a plurality of software-based conversion units that perform a software-based conversion process for converting print document data described in a page description language into page image data having a bitmap image format, each of the plurality of software-based conversion units requesting a hardware-based image processing apparatus to execute specific image processing in the software-based conversion process and generating the page image data including a result of the specific image processing executed by the hardware-based image processing apparatus in response to the request; and
a controller that activates an additional software-based conversion unit that performs the software-based conversion process when there is a possibility that a state where at least one of the plurality of software-based conversion units waits for the hardware-based image processing apparatus to complete the specific image processing occurs,
wherein the controller controls a number of additional software-based conversion units not to exceed a predetermined upper limit.

2. The print document conversion apparatus according to claim 1, wherein a number of software-based conversion units is greater than the predetermined upper limit.

3. The print document conversion apparatus according to claim 1, wherein the plurality of software-based conversion units are provided so that a number of software-based conversion units is determined based on a processing capability of the hardware-based image processing apparatus.

4. The print document conversion apparatus according to claim 2. wherein the plurality of software-based conversion units are provided so that the number of software-based conversion units is determined based on a processing capability of the hardware-based image processing apparatus.

5. The print document conversion apparatus according to claim 1, wherein the controller makes the additional software-based conversion unit process new print document data that is different from the print document data 6. A non-transitory computer readable medium storing a program causing a computer to execute a process comprising:
executing a plurality of software-based conversion units that perform a software-based conversion process for converting print document data described in a page description language into page image data having a bitmap image format, each of the plurality of software-based conversion units requesting a hardware-based image processing apparatus that executes specific image processing in the software-based conversion process to execute the specific image processing and generating the page image data including a result of the specific image processing executed by the hardware-based image processing apparatus in response to the request; and
activating an additional software-based conversion unit that performs the software-based conversion process when there is a possibility that a state where at least one of the plurality of software-based conversion units waits for the hardware-based image processing apparatus to complete the specific image processing occurs, a number of additional software-based conversion units being controlled not to exceed a predetermined upper limit.

7. A print document conversion apparatus comprising:
a plurality of software-based conversion units that perform a software-based conversion process for converting print document data described in a page description language into page image data having a bitmap image format, each of the plurality of software-based conversion units requesting a hardware-based image processing apparatus that executes specific image processing in the software-based conversion process to execute the specific image processing and generating the page image data including a result of the specific image processing executed by the hardware-based image processing apparatus in response to the request;
a calculation unit that executes a calculation required for the software-based conversion process performed by the plurality of software-based conversion units; and
a controller that activates an additional software-based conversion unit that performs the software-based conversion process when there is a possibility that a state where at least one of the plurality of software-based conversion units waits for the hardware-based image processing apparatus to complete the specific image processing occurs,
wherein the controller further performs control to allocate the software-based conversion process performed for a certain unit amount of data in the print document data to the plurality of software-based conversion units and one of additional software-based conversion units, the control being performed so that a number of software-based conversion units other than a software-based conversion unit that is in a state of waiting for the hardware-based image processing apparatus to complete the specific image processing among software-based conversion units to which the certain unit amount of data has been allocated does not exceed a predetermined upper limit based on a processing capability of the calculation unit., 8. A non-transitory computer readable medium storing a program causing a computer to execute a process comprising:
executing a plurality of software-based conversion units that perform a software-based conversion process for converting print document data described in a page description language into page image data having a bitmap image format, each of the plurality of software-based conversion units requesting a hardware-based image processing apparatus that executes specific image processing in the software-based conversion process to execute the specific image processing and generating the page image data including a result of the specific image processing executed by the hardware-based image processing apparatus in response to the request;
executing a calculation required for the software-based conversion process performed using the plurality of software-based conversion units; and
activating an additional software-based conversion unit that performs the software-based conversion process when there is a possibility that a state where at least one of the plurality of software-based conversion units waits for the hardware-based image processing apparatus to complete the specific image processing occurs, wherein control is performed to allocate the software-based conversion process performed for a certain unit amount of data in the print document data to the plurality of software-based conversion units and one of additional software-based conversion units, the control being performed so that a number of software-based conversion units other than a software-based conversion unit that is in a state of waiting for the hardware-based image processing apparatus to complete the specific image processing among software-based conversion units to which the certain unit amount of data has been allocated does not exceed a predetermined upper limit based on a processing capability of a calculation unit that executes the calculation.

* * * * *